US005309714A

United States Patent [19]

Putney et al.

[11] Patent Number: 5,309,714

[45] Date of Patent: May 10, 1994

[54] RATCHET TOOL WITH EXHAUST CHAMBER MANIFOLD WITH SOUND DAMPENING PROPERTIES

[75] Inventors: Gordon A. Putney, Lake Geneva; Kenneth C. Happ, Silver Lake, both of Wis.

[73] Assignee: Snap-on Tools Corporation, Kenosha, Wis.

[21] Appl. No.: 916,374

[22] Filed: Jul. 21, 1992

Related U.S. Application Data

[62] Division of Ser. No. 526,498, May 21, 1990, Pat. No. 5,142,952.

[51] Int. Cl.$^5$ .......................... F16D 31/02; F01N 3/02

[52] U.S. Cl. ........................................ 60/407; 173/219; 181/230

[58] Field of Search ........................... 60/407; 418/270; 91/428; 74/116, 118, 577 R, 577 M; 81/54, 57, 57.13, 57.29, 57.39; 173/218, 219; 181/230

[56] References Cited

U.S. PATENT DOCUMENTS

| | | | |
|---|---|---|---|
| 2,830,560 | 4/1958 | Doeden | 181/230 X |
| 2,946,315 | 7/1960 | Doeden | 418/270 X |
| 2,950,775 | 8/1960 | Zwayer | 181/230 |
| 3,270,834 | 9/1966 | Bratt | 181/230 |
| 3,880,245 | 4/1975 | Anderson, Jr. | 173/219 |
| 4,030,553 | 6/1977 | Rockwell | 181/230 X |
| 4,258,798 | 3/1981 | Campbell et al. | 181/230 X |
| 4,404,799 | 9/1983 | Dudek | 173/219 X |
| 4,673,042 | 6/1987 | Steiner | 173/219 |
| 4,791,836 | 12/1988 | D'Haem et al. | 81/57.39 |
| 4,915,552 | 4/1990 | Hillestad et al. | 418/270 X |
| 5,007,778 | 4/1991 | Hillestad et al. | 418/270 X |
| 5,064,361 | 11/1991 | Kristof et al. | 418/270 X |

*Primary Examiner*—Edward K. Look

*Assistant Examiner*—John Ryznic

*Attorney, Agent, or Firm*—Emrich & Dithmar

[57] ABSTRACT

The tool includes a housing having two substantially semi-cylindrical members. An air motor in the housing has motor end members located adjacent each end thereof. Two O-rings, respectively disposed between the motor and the end members, are squeezable axially so as to be forced radially outwardly to abut the housing. A manifold includes a chamber of a size that dampens Helmholtz frequencies in the exhaust air. A bearing block includes an outer surface configured to transfer operating loads from a crank shaft extending through the bearing block to the housing. Each of the members of the housing has an arm with a cylindrical opening for receiving a rotatable drive body. The drive body has a knob including a shaft having an ear cooperating with an O-ring in the drive body for preventing the knob from inadvertently rotating between operating positions while the tool is in use. An O-ring between the knob and the drive body isolates the housing from shock to the knob resulting when the tool is dropped. A bushing disposed within the opening of one of the arms includes an outer surface having a plurality of serrations to provide a secure fit between the bushing and the arm. A washer and a retaining ring are located adjacent the bushing. A spring is located between the bushing and the retaining ring for biasing the drive body against the arm to provide friction between the drive body and the arm. An elastomeric jacket surrounds the housing.

18 Claims, 11 Drawing Sheets

RATCHET TOOL WITH EXHAUST CHAMBER MANIFOLD WITH SOUND DAMPENING PROPERTIES

This is a divisional of application Ser. No. 07/526,498, filed May 21, 1990, now U.S. Pat. No. 5,142,952.

BACKGROUND OF THE INVENTION

The present invention relates generally to power tools and, more particularly, to an air-operated ratchet tool.

Ratchet tools which are hand held and driven by an air motor are well known. Such tools typically include a housing having a fork at one end within which is disposed a rotatable drive body for loosening and tightening fasteners.

In current air ratchet tools, the air motor is located within the housing such that vibrations of the motor which occur during operation of the tool are transferred to the housing, thereby undesirably causing vibration of the tool while it is in the user's hand. Furthermore, the motor is located within the housing such that cold air produced by the motor during operation causes the housing to become cold, thereby undesirably causing the surface of the tool to become cold while it is in the user's hand.

A ratchet tool includes a knob which is rotatable between fastener-tightening and fastener-loosening positions. However, the knob of currently available tools has a tendency to undesirably move between these positions during use, whereupon a fastener would be loosened even though the knob had been set to tighten the fastener or vice versa.

Since the knob of current ratchet tools extends outwardly from the surface of the housing, it is susceptible to blows which result when the tool is dropped. The shock of the blow to the knob is transferred to the housing, thereby undesirably increasing the risk of damage to the housing in the form of stress cracks or the like.

When a ratchet tool is operated, there is a tendency to oscillate if there is not enough friction between the fastener and the work piece. The ratchet tool typically includes a mechanism associated with the drive body to prevent such slippage from occurring by providing friction between the drive body and the fork or by providing another ratcheting mechanism between the drive body and the housing or by roller clutching. Such friction has been provided by coil springs and pins. This type of mechanism, however, is disadvantageous because it undesirably causes grooves to be formed in the forks.

Additionally, current ratchet tools include a manifold in the housing which provides inlet air to the motor and receives exhaust air from the motor. The pulsating flow of the exhaust air out of the motor causes the creation of Helmholtz frequencies, resulting in undesirable operating noises.

In some current ratchet tools, a bushing is disposed in an opening in one arm of the fork. The bushing surrounds the drive body and is used for the transfer of operating loads from the drive body to the housing via the one fork arm. The bushing, however, is often not securely fit and accurately located within the opening of its associated fork arm such that it has a tendency to be rotated with the drive body or not aligned with the base of the other fork arm. As a result, operating loads are not effectively transferred from the drive body to the housing.

The housing of currently available ratchet tools is comprised of three axially segmented members within which all of the elements of the tool are located. With axial segmentation, the manufacturing and assembly process is necessarily complicated since it is difficult to machine internal geometries accurately and locate and align each of the elements within the housing. Further, it is difficult to gain access to the elements in the event that repair of the tool is needed.

SUMMARY OF THE INVENTION

It is a general object of the present invention to provide a ratchet tool which avoids the disadvantages of prior ratchet tools while affording additional structural advantages.

It is an object of the present invention to reduce the operating noises and vibrations of a ratchet tool housing which result from the pulsating flow of exhaust air into the manifold.

It is a further object of the present invention to prevent the rotation of the bushing and assure the effective transfer of operating loads from the bushing to the housing.

It is a further object of the present invention to simplify the assembly of a ratchet tool and to provide easy access to the elements in the tool housing when repair is needed.

It is a further object of the present invention to make it more comfortable to hold a ratchet tool.

In summary, there is provided a ratchet tool comprising an elongated housing including a front end and a rear end, motor means in the housing producing a predetermined volume of exhaust air, a manifold in the rear end of the housing, the manifold including inlet means for delivering air to the motor means and outlet means for receiving exhaust air from the motor means, the outlet means including a chamber having a volume compared to the predetermined volume of exhaust air to dampen and dissipate Helmholtz frequencies, drive means in the front end of the housing, and means in the housing for coupling the motor means to the drive means and thereby transferring power from the motor means to the drive means.

In a further aspect of the present invention, there is provided a manifold including first and second passageways for delivering air to the motor means, a valve seat interconnecting the first and second passageways, a valve ball seated on the valve seat and preventing inlet air from flowing from the first passageway and into the second passageway, and means for pushing the valve ball away from the valve seat to allow air to flow from the first passageway and through the second passageway and into the motor means.

In a further aspect of the present invention, there is provided a ratchet tool comprising an elongated housing including a front end and a rear end and an opening at the rear end, the housing including first and second members, each of the members having an inner surface and two opposite longitudinal side edges, the side edges of the first member being respectively adjacent to the side edges of the second member, the juncture between the side edges tending to be imperfect thus allowing escape of air, motor means in the housing, drive means in the front end of the housing, means in the housing coupling the motor means to the drive means and transferring power from the motor means to the drive means, a manifold in the rear end of the housing and including a front end and a rear end, the manifold including inlet means for delivering air to the motor means and outlet means for receiving exhaust air from the motor means, the exhaust air tending to flow through the rear end of the manifold and along the inner surface of the first and second members and through the juncture between the side edges, and sealing means in the housing between the rear end of the manifold and the opening in the housing for substantially preventing the exhaust air from flowing along the inner surface of the first and second members.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENT

Figure 1:
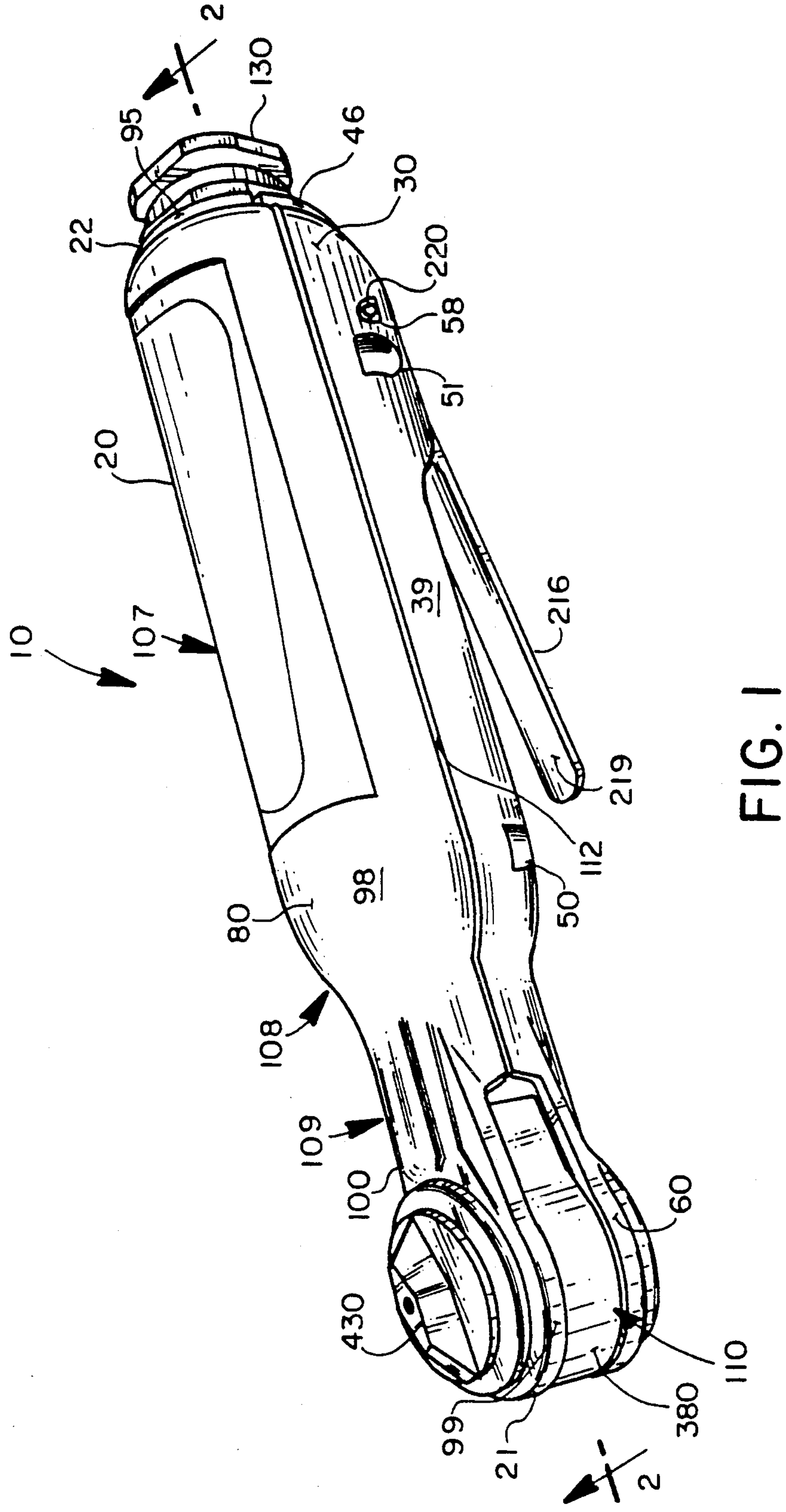
FIG. 1 is a perspective view of a ratchet tool constructed in accordance with the features of the present invention.

Turning now to the drawings and, more particularly to FIG. 1 thereof, there is depicted a ratchet tool designated 10, constructed in accordance with the present invention. The ratchet tool 10 comprises an elongated housing 20 including a front end 21 and a rear end 22. The housing 20 includes an elongated, substantially semi-cylindrical base member 30 and an elongated, substantially semi-cylindrical cover member 80. The ratchet tool 10 comprises an exhaust nut 130 located at the rear end 22 of the housing 20, a paddle 216 pivotally secured to the base member 30, and a motor 260 (FIG. 2) in the housing 20. The housing 20 includes, at the front end 21 thereof, a fork defined by arms 60 and 99. A ratchet head 380 is disposed between these arms 60 and 99. A drive body 390 (FIG. 2) is carried by arms 60 and 99 and the ratchet head 380. A knob 430 on the drive body is rotatable between fastener tightening and loosening conditions. A stud 393 (FIG. 2) at the end of the drive body 390 is adapted to receive a socket (not shown). The position of the knob 430 is selected for tightening or loosening. The user's hand surrounds the housing 20 such that his fingers are located outside the paddle 216. The selected socket on the tool 10 receives the fastener (not shown) to be loosened or tightened. Inlet air is introduced to the tool 10 via a hose (not shown) which is attached to the exhaust nut 130. The inlet air is allowed to flow into the motor by depressing the paddle 216. The power produced by the motor is transferred via coupling means to the ratchet head 380 which is caused to oscillate and which, in turn, causes the rotation of the drive body 390 to cause the tightening or loosening of the fastener.

Figure 6:
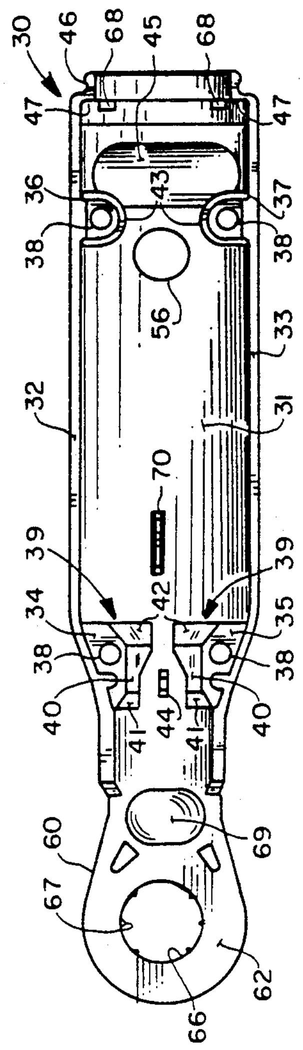
FIG. 6 is a plan view of the inner surface of the base member of the ratchet tool.
Figure 7:
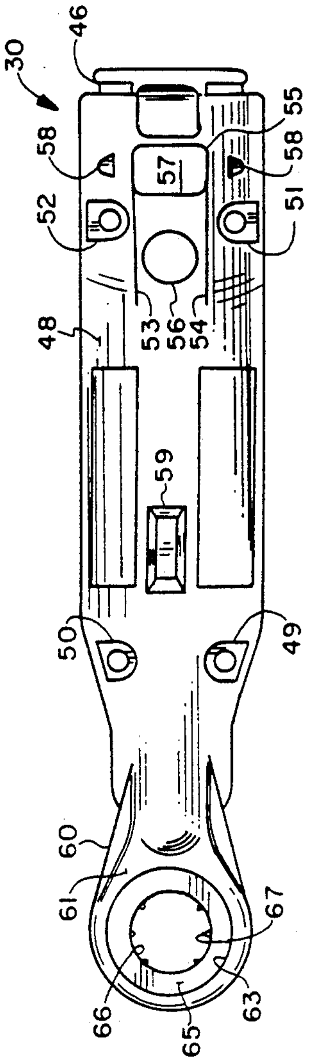
FIG. 7 is a plan view of the outer surface of the base member of the ratchet tool.

Referring to FIGS. 6 and 7, the base member 30 is of integral, one-piece construction and includes an inner surface 31 and opposite longitudinal side edges 32 and 33. Two front lugs 34 and 35 and two rear lugs 36 and 37 are located along the opposite side edges 32 and 33 respectively. Each of the lugs 34–37 is formed integrally with the member 30 and has a hole 38 therein. Each of the lugs 34 and 35 has an outer surface 39 defined by a part-cylindrical portion 40 and part-conical portions 41 and 42 respectively at opposite ends of the part-cylindrical portion 40. Each of the lugs 36 and 37 has an outer surface 43. A pedestal 44, located between the lugs 34 and 35, extends radially inwardly from the inner surface 31. Further, an abutment 45 is located on the inner surface 31 adjacent the lugs 36 and 37 and extends between the opposite side edges 32 and 33. Still further, a rectangularly shaped recess 70 is located on the inner surface 31.

The rear end of the base member 30 includes a semi-cylindrical reduced diameter portion having a recess 46 and includes a semi-circumferential shoulder 47 on the inner surface 31. A pair of tabs 68 extend outwardly from the shoulder 47.

The base member 30 includes an outer surface 48 with a plurality of recesses 49–52 respectively aligned with the lugs 34–37. Protruding outwardly from the outer surface 48 are longitudinally extending walls 53 and 54 and a laterally extending wall 55. A circular opening 56 and a recess 57 are located between the walls 53 and 54. Two recesses 58 are respectively located outside the walls 53 and 54, and adjacent thereto. The recesses 57 and 58 are laterally aligned. Finally, a projection 59 corresponds to the recess 70 on the inner surface 31.

Figure 18:
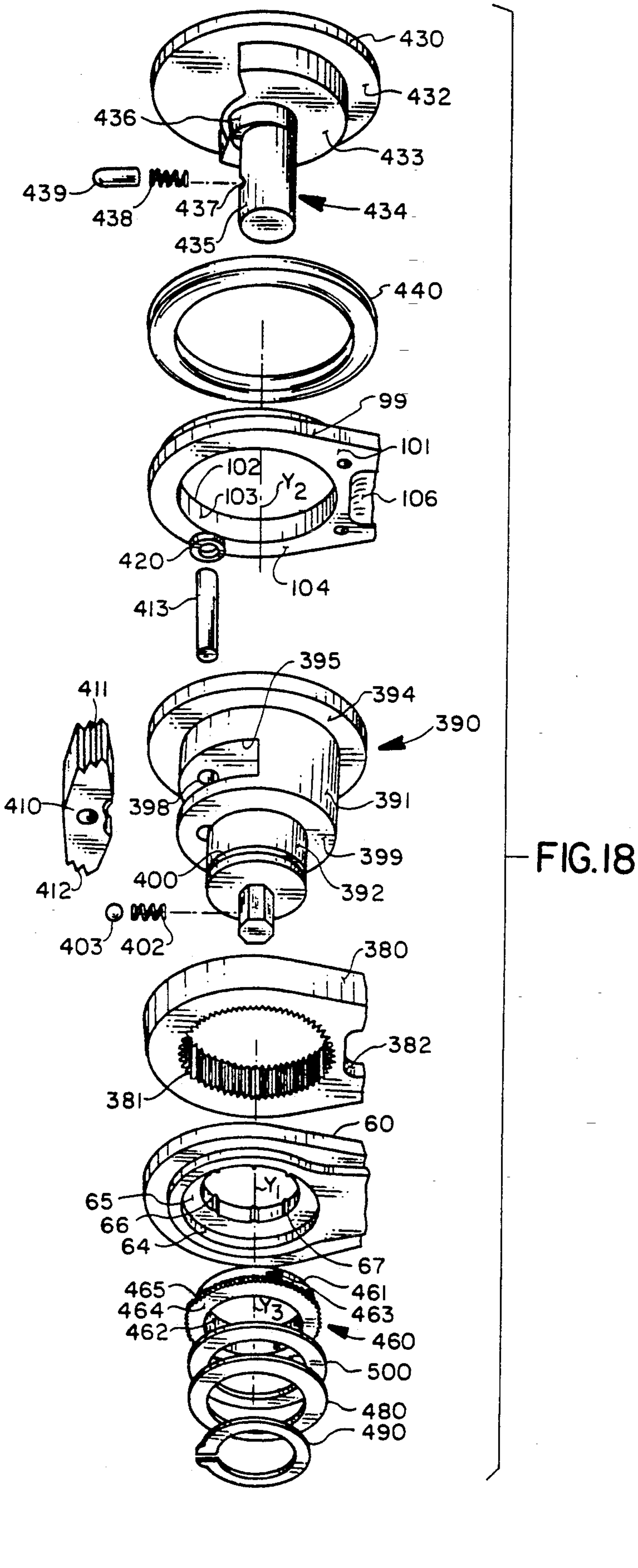
FIG. 18 is an exploded view of the drive assembly.

The base member 30 includes, at its front end, a fork or arm 60 having an outer surface 61 and an inner surface 62. An oval recess 69 is located on the inner surface 62. As shown in FIG. 18, the arm 60 includes a cylindrical surface 64 having a longitudinal axis $Y_1$. A shoulder 65, extends radially inwardly from the cylindrical surface 64. The shoulder 65 has an outer surface 66 defining a cylindrical opening 63. A plurality of ribs 67 extend from the outer surface 66. In the preferred embodiment, the outer surface 66 has six ribs 67. The shoulder 65 is offset from the surface 64 to define a pocket.

Figure 8:
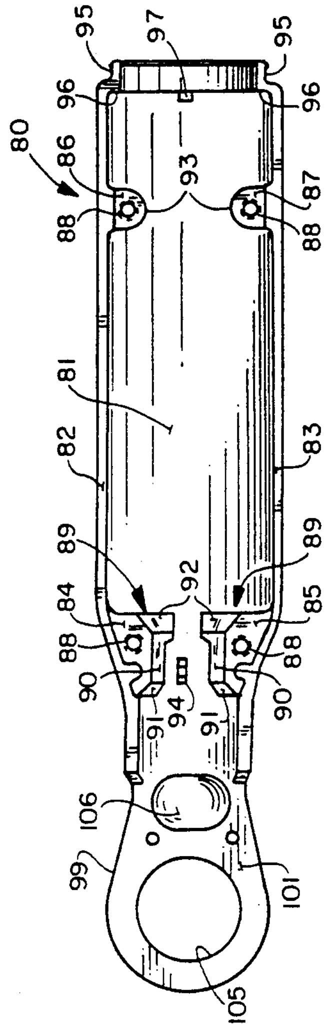
FIG. 8 is a plan view of the inner surface of the cover member of the ratchet tool.

Referring to FIG. 8, the cover member 80 is of integral, one-piece construction and includes an inner surface 81 and opposite longitudinal side edges 82 and 83. Two front lugs 84 and 85 and two rear lugs 86 and 87 are located along the opposite side edges 82 and 83 respectively. Each of the lugs 84–87 is formed integrally with the member 80 and has a hole 88 therein. Each of the lugs 84 and 85 has an outer surface 89 defined by a part-cylindrical portion 90 and part-conical portions 91 and 92 respectively at opposite ends of the part-cylindrical portion 90. Each of the lugs 86 and 87 has an outer surface 93. A pedestal 94, located between the lugs 84 and 85 extends radially inwardly from the inner surface 81.

The rear end of the cover member 80 includes a semi-cylindrical reduced diameter portion having a recess 95 and includes a shoulder 96 on the inner surface 81. A tab 97 extends axially inwardly from the shoulder 96.

The cover member 80 includes, at its front end, a fork arm 99 having an outer surface 100 (FIG. 1) and an inner surface 101. An oval recess 106 is located on the inner surface 101. As shown in FIG. 18, the arm 99 includes an opening 102 defined by a cylindrical surface 103 having a longitudinal axis $Y_2$. A shoulder 104 extends radially outwardly from the cylindrical surface 103.

Because the members 30 and 80 are separate, they can be die cast or molded instead of machined, thereby substantially reducing the cost of manufacturing the housing 20. The use of die casting or molding allows the shape and geometry of the elements of the members 30 and 80 to be controlled with a precision, consistency and accuracy at low cost which is not possible when machining is employed. Also, the use of two separate members obviates the difficulties associated with machining the inner surface of a unitary member.

Figure 2:
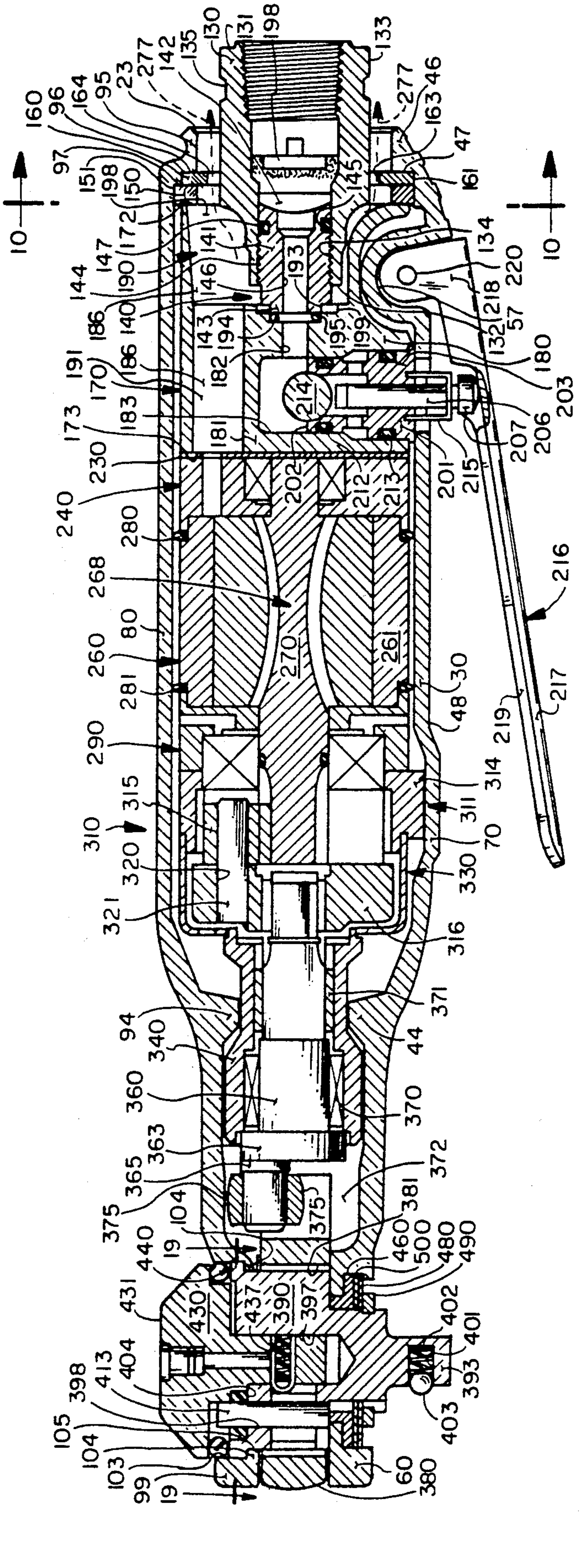
FIG. 2 is a cross-sectional view of the ratchet tool, on an enlarged scale, taken along the line 2—2 of FIG. 1.
Figure 4:
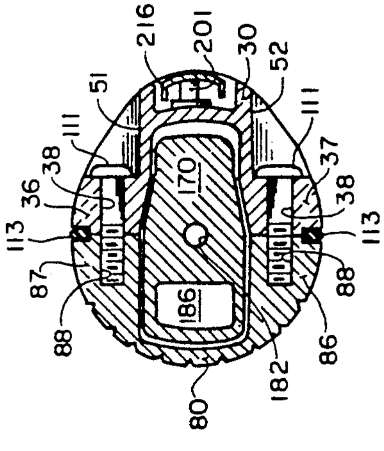
FIG. 4 is a cross-sectional view of the ratchet tool, taken along the line 4—4 of FIG. 3.
Figure 5:
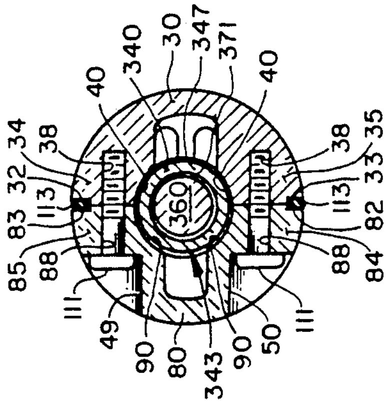
FIG. 5 is a cross-sectional view of the ratchet too, taken along the line 5—5 of FIG. 3.

As shown in FIG. 4, the lugs 36 and 37 mate respectively with the lugs 87 and 86 when the members 30 and 80 are secured together. In a like manner, and as shown in FIG. 5, the lugs 34 and 35 mate respectively with the lugs 85 and 84. The holes 38 in the lugs 34–37 are aligned with the holes 88 in the lugs 84–87. A screw 111 (FIGS. 4 and 5) extends through each pair of mating holes 38 and 88 for attaching the two members 30 and 80 together. As shown in FIG. 5, when the two members 30 and 80 are attached together, the side edges 32 and 33 of the base member 30 are respectively adjacent to the side edges 83 and 82 of the cover member 80 to define a juncture 112 (FIG. 1) extending longitudinally on each side of the housing 20 from the rear end 22 to the arms 60 and 99. Further, and as shown in FIG. 2, the recess 46 and the shoulder 47 on the base member 30 mate respectively with the recess 95 and the shoulder 96 on the cover member 80. The arms 60 and 99 are aligned such that the longitudinal axis $Y_1$ is substantially aligned with the longitudinal axis $Y_2$. For cosmetic reasons, an elongated gasket 113 (FIGS. 4 and 5) is located in each of the gaps 112.

As shown in FIG. 1, when the two members 30 and 80 are attached together, the housing 20 comprises an elongated, generally cylindrical grasping portion 107, a tapered portion 108 extending from the grasping portion 107, a neck portion 109 extending from the tapered portion 108, and a fork 110 defined by the arms 60 and 99, extending from the neck portion 109. The arms 60 and 99 are parallel and spaced from each other to define a receptacle for the ratchet head 380.

Figure 9A:
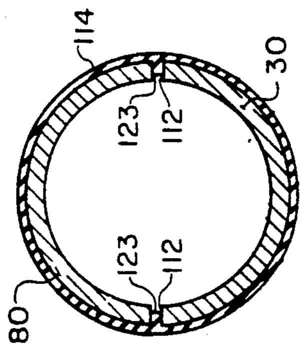
FIG. 9A is a cross-sectional view through the jacket and the housing, without any of the parts in the housing depicted.
Figure 9:
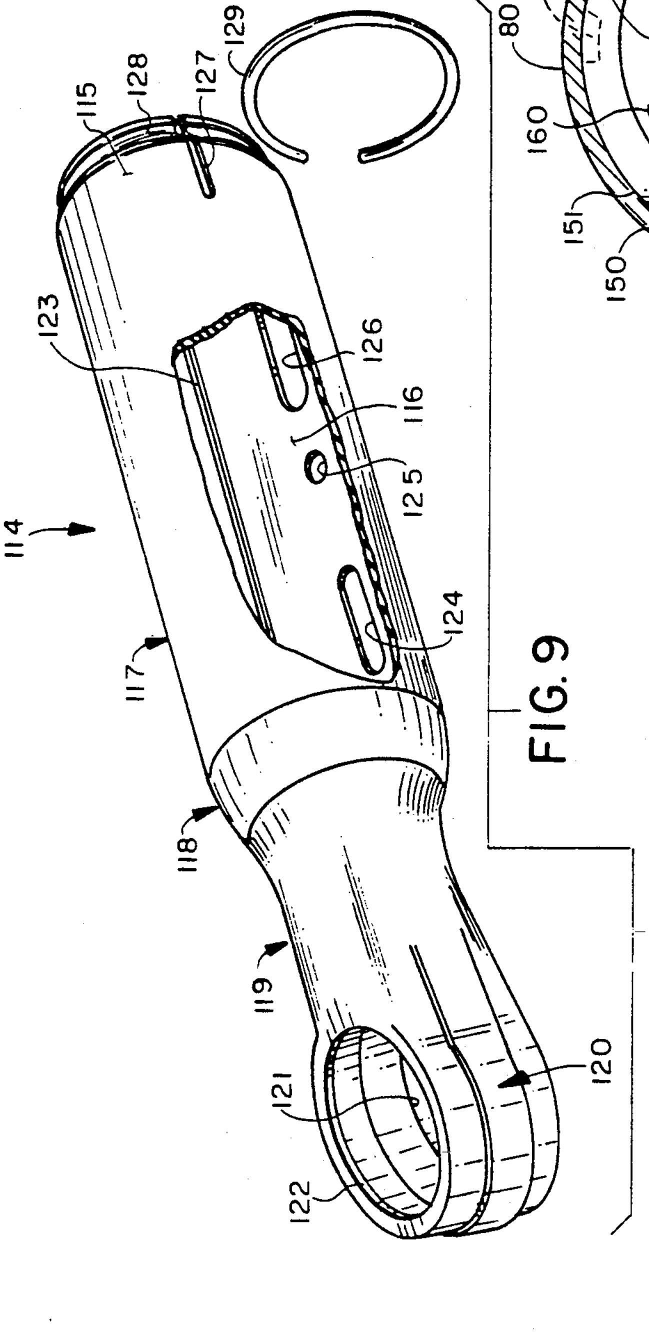
FIG. 9 is a perspective view of the jacket which surrounds the ratchet tool of FIG. 1, with a portion thereof broken away to expose its interior.

As shown in FIG. 9, there is provided a generally cylindrical jacket 114 for covering the ratchet tool 10. The jacket 114 includes an outer surface 115 and an inner surface 116. The outer surface 115 has an elongated, generally cylindrical portion 117, a tapered portion 118 extending from the cylindrical portion 117, a neck portion 119 extending from the tapered portion 118, and a head portion 120 extending from the neck portion 119. Circular openings 121 and 122 are located on opposite sides of the head portion 120. Substantially parallel ribs 123 extend longitudinally along the inner surface 116 respectively on the sides of the jacket 114. In a specific form of the invention, the inner end of each rib 123 was wider than the portion nearest the main cylindrical portion of the jacket. The jacket 114 also includes longitudinally extending, oval openings 124, 125 and 126. The end of jacket 114 opposite head portion 120 contains a pair of axially extending slits 127 and a portion of reduced diameter having a groove 128 therein. A C-ring 129 is adapted to slip onto groove 128 as will be described. That portion of the inside of the jacket aligned with the groove 128 is a projection that fits within the recesses 46 and 95.

The jacket 114 is composed of an elastomeric material, and serves as a shock absorber during rough handling, as a vibration isolator, as a thermal isolator and as a soft and non-slip grip enhancer. Further, it protects the housing 20 from stress enhancing nicks and scratches, and prevents air exhausted in the tool from reaching the user's hand.

When the jacket 114 is on the tool 10, the cylindrical portion 117, the tapered portion 118, the neck portion 119, and the head portion 120 mate respectively with the cylindrical portion 107, the tapered portion 108, the neck portion 109, and the fork 110 of the housing 20. The ribs 123 are disposed respectively in the gaps on opposite sides of the housing 20, whereby the jacket 114 is securely fit to the housing 20. The projection 59 on the base member 30 (FIG. 7) extends through the opening 124, and the opening 126 mates with the opening 56 and the recess 57 in the base member 30. Still further, the circular openings 121 and 122 are aligned respectively with the openings 63 and 102 in the arms 60 and 99. The opening 125 is aligned to allow the identification of a serial number engraved on the outer surface of the base member 30.

In order to assemble jacket 114 onto housing 20, a lubricant is preferably applied to inner surface 116. The jacket is stretched and then slid into place on the housing in such a way that the ribs 123 are respectively located in the gaps 112 between base member 30 and cover member 80, as can be best seen in FIG. 9A. With the ribs so positioned, jacket 114 is retained in place and does not twist with respect to the housing. Then, C-ring 129 is applied to groove 128 whereby the projection corresponding to such groove is held in recesses 46 and 95.

Ratchet tool 10 can be used with or without jacket 114. When employed with the jacket, gasket 113 is not employed, and, instead, is replaced with ribs 123 of jacket 114.

Figure 3:
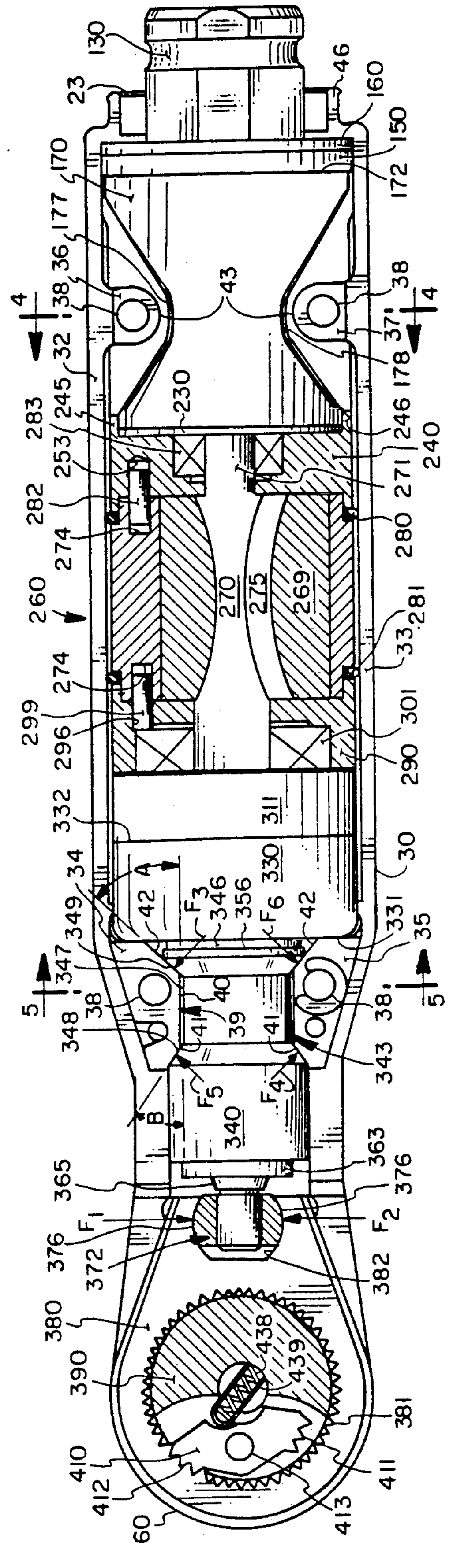
FIG. 3 is a partial plan view of the ratchet tool without the cover member, sectioned through the drive body and the motor.

As shown in FIGS. 2 and 3, the exhaust nut 130 includes opposite ends 131 and 132, an outer surface 133, and a longitudinally extending threaded bore 134. The outer surface 133 has a circumferential recess 135.

As shown in FIG. 2, the ratchet tool 10 further comprises a screw 140 including an elongated body 141, a head 142 at one end of the body 141 and a nose 143 at the other end of the body 141. The body 141 has a threaded outer surface 144 and a circumferential recess 145. A bore 146 extends longitudinally from the body 141. The screw 140 is threaded into the bore 134 of the exhaust nut 130. An O-ring 147 is disposed in the recess 145 to provide a seal between the exhaust nut 130 and the screw 140. As shown in FIG. 2, a filter 148 is disposed in the bore 134 adjacent the head 142 of the screw 140.

Figure 10:
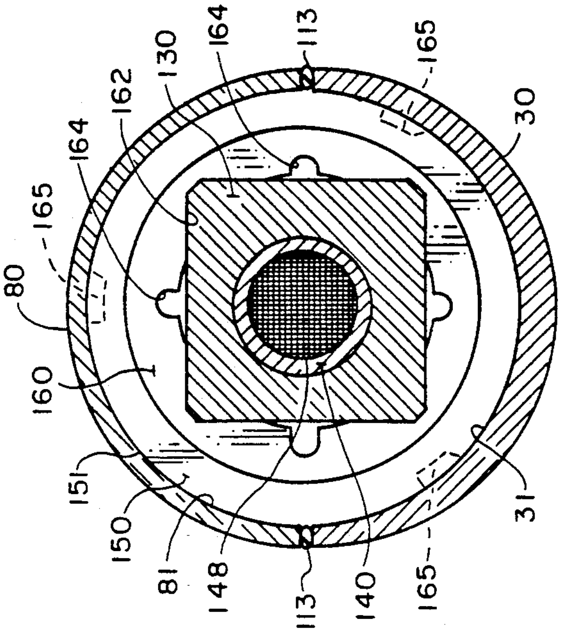
FIG. 10 is an enlarged cross-sectional view of the ratchet tool, taken along the line 10—10 of FIG. 2.

As shown in FIGS. 2 and 10, the ratchet tool 10 further comprises an annular seal ring 150 including an outer surface 151. A washer 160 includes an outer surface 161, an opening 162 (FIG. 10) defined by an inner surface 163, and a plurality of apertures 164 extending radially outwardly from the inner surface 163. Further, the washer 160 includes a plurality of recesses 165 extending inwardly from the outer surface 161.

The washer 160 is disposed within the housing 20 such that its outer surface 161 contacts the inner surfaces 31 and 81 respectively of the members 30 and 80. The washer 160 is disposed against the shoulders 47 and 96 of the members 30 and 80. The recesses 165 mate with the tab 97 on the inner surface 81 of the member 80, and the tabs 68 on the inner surface 31 of the member 30 to prevent rotation of the washer 160 within the housing 20. The inner surface 163 engages the outer surface 133 of the nut 130 extending through the washer 160. In a like manner, the outer surface 151 of the seal 150 engages the inner surfaces 31 and 81 of the members 30 and 80.

Figure 13:
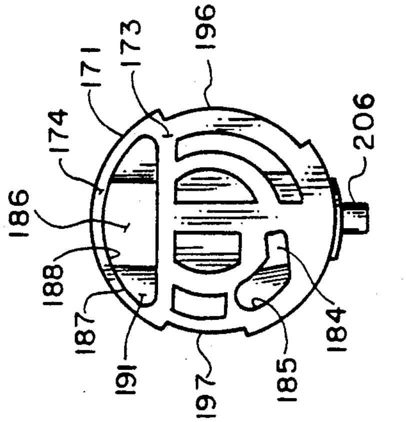
FIG. 13 is an end view of the other end of the manifold.
Figure 12:
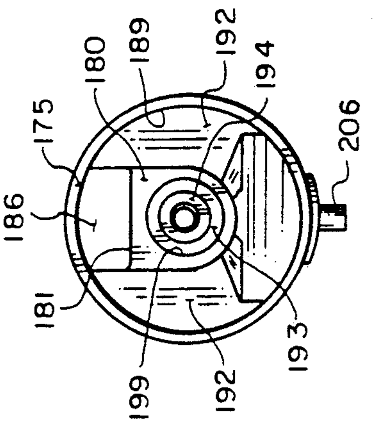
FIG. 12 is an end view of one end of the manifold.
Figure 11:
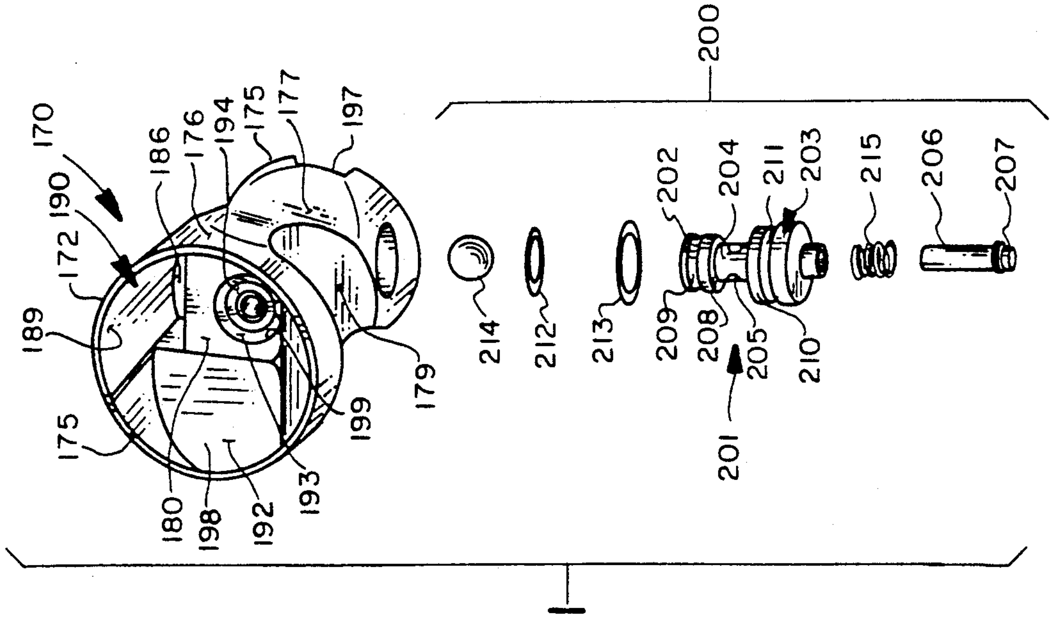
FIG. 11 is a perspective view of the manifold of the ratchet tool, and an exploded view of the valve assembly therein.

Referring to FIGS. 11–13, the tool 10 further comprises a generally cylindrical manifold 170, the manifold 170 including a front end 171, a rear end 172 and a transverse end wall 173 at the front end 171. The manifold 170 further includes a circumferential peripheral edge 174 at the front end 171 and a circumferential peripheral edge 175 at the rear end 172. The peripheral edge 174 has a pair of recesses 196 and 197. Further, the manifold 170 includes an outer surface 176 having opposed side recesses 177 and 178 (FIG. 3) and a bottom recessed portion 179. The manifold 170 includes a transverse intermediate wall 180 and a longitudinal intermediate wall 181 extending between the transverse walls 173 and 180. The manifold 170 includes a first passageway 182 (FIG. 2) located in the wall 180, a bore 183 (FIG. 2) communicating with the first passageway 182, and a second passageway 184 in the wall 173 communicating with the bore 183. The wall 180 has two counter-bores 195 and 199 (FIG. 2) surrounding the opening of the first passageway 182. The second passageway 184 extends from the bore 183 and terminates in an arcuate inlet aperture 185 in the transverse end wall 173. The first passageway 182 extends longitudinally through the manifold 170 and transversely to the bore 183.

The manifold 170 has an exhaust chamber 190 with three portions, an entry portion 191, a central portion 186 and an exit portion 198. Entry portion 191 is generally located forwardly of wall 180, exit portion 198 is located rearwardly of that wall and central portion 86 is generally coextensive with such wall. Recessed portions 177 and 178 create converging side walls 192, which, along with the inner surface of recessed portion 179, define entry portion 191. Central portion 186 is generally in the form of a parallelepiped although its upper surface is slightly cylindrical. Entry portion 191 also has slightly converging side walls due to the recessed portions 177 and 178. Thus, exit portion 198 is large and portions 186 and 191 are substantially smaller.

A washer 193 and an O-ring 194 are respectively located within the counter-bores 195 and 199 in the transverse intermediate wall 180 (FIG. 2).

Referring to FIGS. 2 and 3, the manifold 170 is located in the housing 20. The lugs 36 and 37 on the base member 30 and the lugs 87 and 86 on the cover member 80 mate respectively with the opposed side recessed portions 177 and 178, while the abutment 45 on the inner surface 31 of the base member 30 mates with the bottom recessed portion 179. Further, the nose 143 of the screw 140 engages the washer 193 and the O-ring 194.

Referring to FIG. 11, the ratchet tool 10 further comprises a valve assembly 200. The valve assembly 200 includes a one-piece elastomeric valve bushing 201 having a valve seat 202, a guide 203 and a sleeve 204 between the valve seat 202 and the guide 203. The valve seat 202 has an outer surface 208 with a circumferential groove 209, while the guide 203 has an outer surface 210 with a circumferential groove 211. The sleeve 204 has an aperture 205. A pin 206 having a head 207 extends through the guide 203, the sleeve 204 and the valve seat 202. The valve assembly 200 further includes a pair of O-rings 212 and 213, a valve ball 214 and a spring 215.

FIG. 2 depicts the manner in which the valve assembly 200 is mounted in the housing 20. The valve bushing 201 is located in the bore 183 of the manifold 170 and the O-rings 212 and 213 are respectively located within the grooves 209 and 211 to provide a seal between the bushing 201 and the bore 183. The force of the inlet air pressure in the first passageway 182 keeps the valve ball 214 seated against the valve seat 202. The spring 215 has one end disposed against the guide 203 and an opposite end disposed against the head 207 of the pin 206.

To move the pin 206, the ratchet tool 10 further comprises a paddle 216 including an arm 217, a shoulder 218 and an inner surface 219. The paddle 216 is pivotally mounted to the outer surface 48 of the base member 30 by means of a pin 220 extending through the shoulder 218 which is received in the recess 57. The inner surface 219 abuts the head 207 of the pin 206.

As described earlier, compressed air is delivered to the tool 10 via a hose (not shown) which is attached to the nut 130. The air flows through the bore 134 of the nut 130 and the bore 146 of the screw 140, through the passageway 182 in the manifold 170 and into the bore 183, forcing the valve ball 214 to seat on the valve seat 202. Thus, air is prevented from flowing from the passageway 182 into the passageway 184.

Referring to FIGS. 2 and 11, to turn on the ratchet tool, the paddle 216 is pivoted towards the base member 30 causing the pin 206 to push the ball 214 away from the valve seat 202, thereby allowing air to flow from the passageway 182, through the valve seat 202, through the aperture 205 in the sleeve 204, and through the passageway 184. The air then flows through the aperture 185, and into the motor as to be described later.

Figure 14:
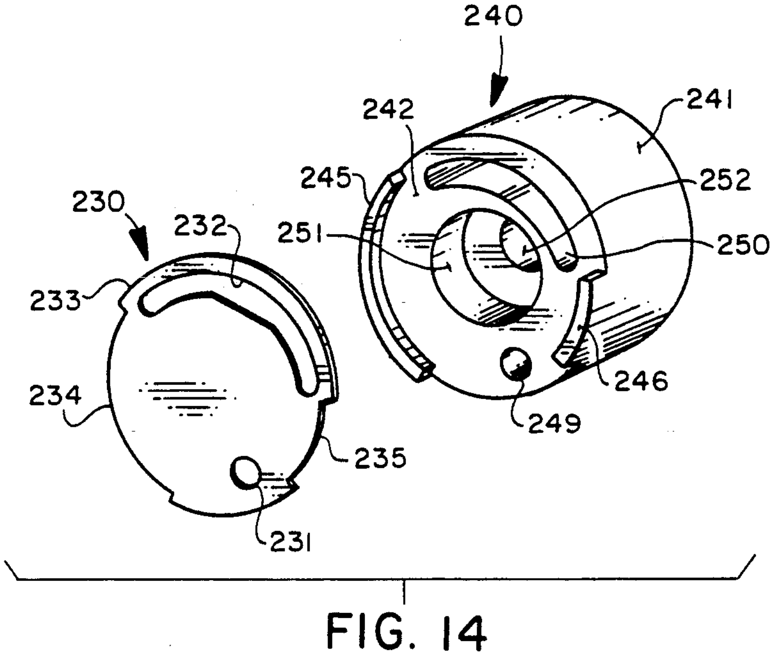
FIG. 14 is a perspective view of one of the motor end members and the gasket.

As shown in FIG. 14, the ratchet tool 10 further comprises a manifold gasket 230 including a circular aperture 231 and an elongated arcuate aperture 232. The gasket 230 additionally includes a circumferential edge 233 having a pair of recesses 234 and 235. As shown in FIG. 2, the gasket 230 is disposed in the housing 20 against the transverse end wall 173 of the manifold 170 such that the aperture 232 communicates with the aperture 187. Although not shown in any of the figures, the recesses 234 and 235 of the gasket 230 are respectively aligned with the recesses 196 and 197 of the manifold 170 and the aperture 231 communicates with the aperture 185.

Figure 15:
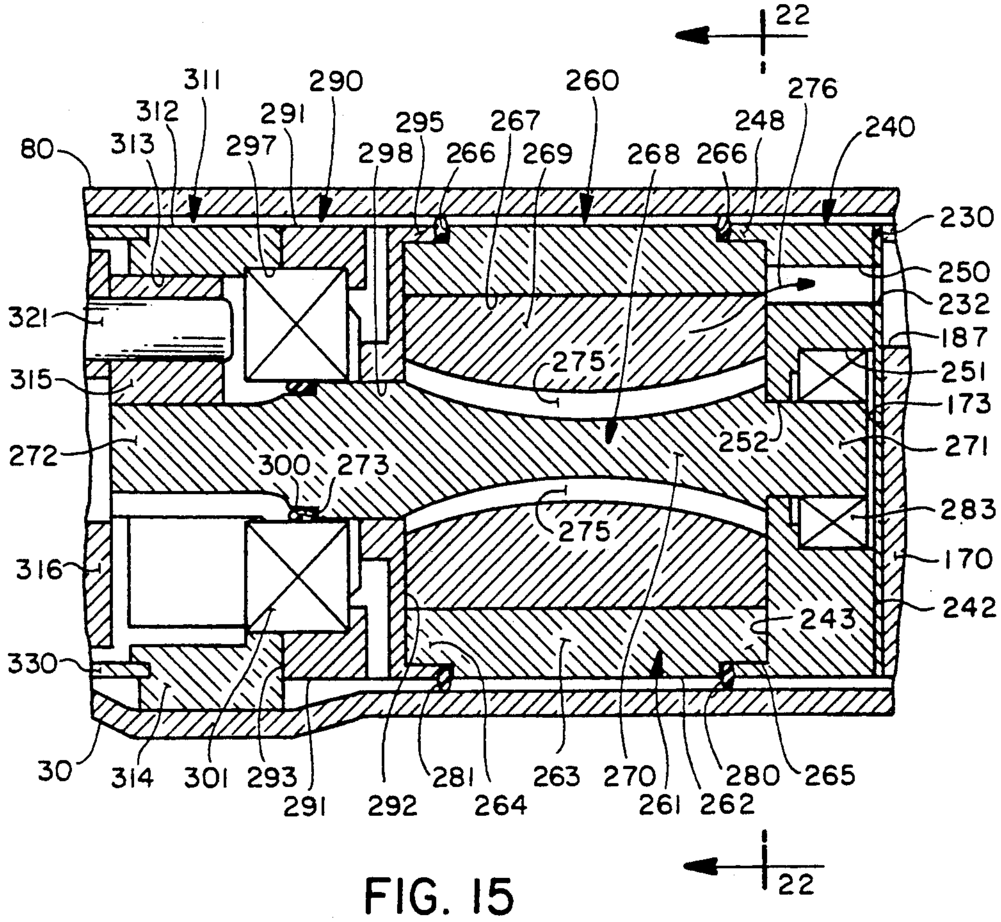
FIG. 15 is an enlargement of that portion of FIG. 2 depicting the motor and end members.

Referring to FIGS. 3 and 15, the ratchet tool 10 additionally comprises generally cylindrical motor end members 240 and 290 located at opposite ends of a motor 260. As shown in FIG. 14, the member 240 includes an outer surface 241, an end surface 242, and an opposed end surface 243 (FIG. 15). Annular lips 245 and 246 protrude axially from the end wall 242. An annular lip 248 (FIG. 15) protrudes axially from the end wall 243. The member 240 further includes a cylindrical passageway 249 and an elongated arcuate passageway 250 extending between the end walls 242 and 243. The member 240 further includes axially extending, communicating bores 251 and 252, the latter being of smaller diameter. A bore 253 (FIG. 3) located adjacent the annular lip 248 extends into the end wall 243.

Referring to FIG. 15, the generally cylindrical front end member 290 includes an outer surface 291 and opposed end surfaces 292 and 293. An annular lip 295 extends rearwardly from the surface 292. An axially extending bore 296 (FIG. 3) is in the member 290 and is located near its periphery. The member 290 has a central hole 298 and an annular bore 297 of larger diameter.

As shown in FIGS. 2 and 15, the member 240 is disposed in the housing 20 adjacent the gasket 230 and the manifold 170 and between the gasket 230 and the motor 260. The lips 245 and 246 (FIG. 3) respectively are located in recesses 234 and 235 of the gasket 230 and the recesses 196 and 197 of the manifold 170 to provide a secure and sealed interconnection between the manifold 170, the gasket 230 and the member 240. The passageways 249 and 250 in the member 240 are respectively aligned with the apertures 231 and 232 in the gasket 230 (FIG. 14) and respectively communicate with the passageways 182 and 184 (FIG. 13) in the manifold 170.

Referring to FIG. 15, the motor 260 is of generally standard configuration and includes a cylindrical liner 261 having an outer surface 262. The liner 261 has a main central portion 263 and short end portions 264 and 265 respectively at opposite ends of the central portion 263. The end portions 264 and 265 are of slightly reduced diameter so that an annular radial face 266 is defined between each of the end portions 264 and 265 and the central portion 263. An axially extending bore 274 (FIG. 3) extends partially into the liner 261 at each end thereof. The liner 261 includes an inner surface 267 defining a cylindrical chamber. A rotor 268, including a shaft 270 and a plurality of arcuate slots 275, is centrally located within the liner 261. The shaft 270 has ends 271 and 272, the latter being toothed. A circumferential recess 273 is near the end 272. A plurality of vanes 269 extend radially outwardly from the rotor 268. The vanes 269 have a generally flat upper surface and a curved lower surface. They are disposed in associated arcuate slots 275 and engage the inner surface 267 of the liner 261 along the length thereof.

The annular lip 248 of the member 240 encircles the end portion 265 of the liner 261. An O-ring 280 encircles the end portion 265 and is disposed between the annular lip 248 and the radial face 266. A roll pin 282 (FIG. 3) extends into the bore 274 in the liner 261 and the bore 253 in the member 240 to align the motor 260 and the member 240. The end 271 of the shaft 270 extends into the bores 251 and 252 in the member 240. A ball bearing 283 is disposed in the bore 251 and provides a journal for the end 271 of the shaft 270.

The lip 295 of the member 290 encircles the end portion 264 of the liner 261. An O-ring 281 is disposed between the lip 295 and the face 266 of the liner 261. A roll pin 299 (FIG. 3) is disposed in the bore 296 of the member 290 and the bore 274 of the liner 261 to align the member 290 and the motor 260. The toothed end 272 of the shaft 270 extends through the hole 298 in the member 290. An O-ring 300 is disposed in the recess 273 of the shaft 270. A ball bearing 301 is disposed in the bore 297 of the member 290 and provides a journal for the toothed end 272 of the shaft 270. In view of the journaling of the ends 271 and 272 in the bearings 283 and 301 respectively, the rotor 268 is secured in the liner 261 and is axially rotatable therein.

Figure 22:
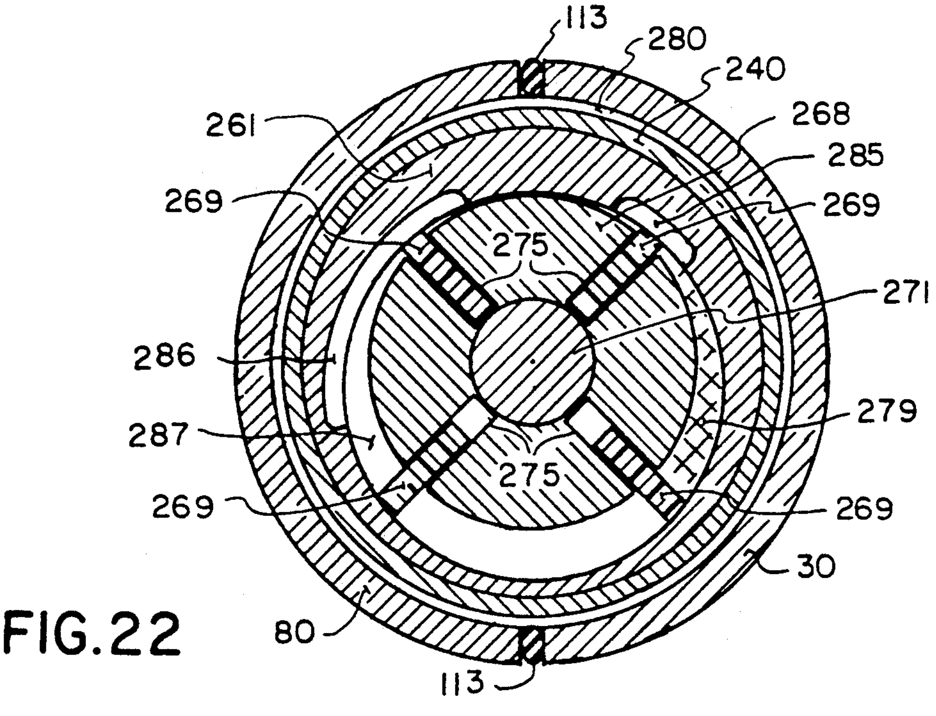
FIG. 22 is a cross-sectional view taken along the line 22—22 of FIG. 15.

The standard motor 260 operates in a well known manner. Referring to FIG. 22, air enters the chamber defined by the liner 261 via the aperture 231 in the gasket 230 and the passageway 249 in the member 240 and inlet pocket 255. The inlet air pressurizes the chamber 279 (indicated by cross hatching) enclosed by the vanes 269. Differential pressures acting on differential exposed vane areas cause the rotor 268 to rotate in the liner 261. Because the liner 261 and the rotor 268 (FIG. 3) are eccentric, the vanes 269 move in and out of the associated slots 275. Referring to FIG. 15, the rotor 268 is concentric with the housing 20, but the inner surface 267 of the liner 261 is off-center or eccentric. As the rotor 268 and the vanes 269 rotate, air initially trapped between adjacent pairs of vanes 269 is vented (arrow 276) when exposed to the exhaust pocket 286, then passageway 250 in the member 240.

Referring to FIGS. 2 and 15, the exhaust air flows through the passageway 250 in the member 240, into chamber 190 of manifold 170, exiting the tool through opening 23. As described above, the manifold 70 thus provides air handling features for both inlet and exhaust air.

The chamber 190 is sized to dampen Helmholtz frequencies of the exhaust air. Helmholtz frequencies are created by the explosive release of air from the exhausting chamber of the air motor 260. The presence of Helmholtz frequencies is manifested by a "popping" sound which emanates from the interior of the tool. The chamber 190 is sized such that its volume is at least three times the volume of the exhaust chamber 287 (FIG. 22) in the motor 260. In an operative form of the invention, the ratio of the volume of exhaust chamber 287 in motor 260 to the volume of chamber 190 was 1:5. It is also important that chamber 190 not be long and narrow. The narrowest part of the chamber is portion 186. In an actual embodiment, the central portion 186 had a height of about 0.25 inch, a width of 0.4 inch and a length of about 0.375 inch. When the above criteria are satisfied, the Helmholtz frequencies are dampened and dissipated, thereby resulting in the significant reduction in the level of the "popping" sound emanating from the tool 10.

The exhaust air has a tendency to flow through the rear end 172 of the manifold 170 and along the inner surfaces 31 and 81 respectively of the members 30 and 80 and through the gaps 112. This type of flow is undesirable because the exhaust air would then come into contact with the user's hand. The seal 150 and the washer 160 are disposed between the rear end 172 of the manifold 170 and the opening 23 in the housing 20 such that exhaust air flowing through the chamber 190 is forced to flow in the direction of arrow 277 (FIG. 2) along the inner surface of the seal 150 and the inner surface of the washer 160 and through the apertures 164 therein. As a result, the exhaust air is prevented from flowing along the inner surfaces 31 and 81 respectively of the members 30 and 80.

Figure 17:
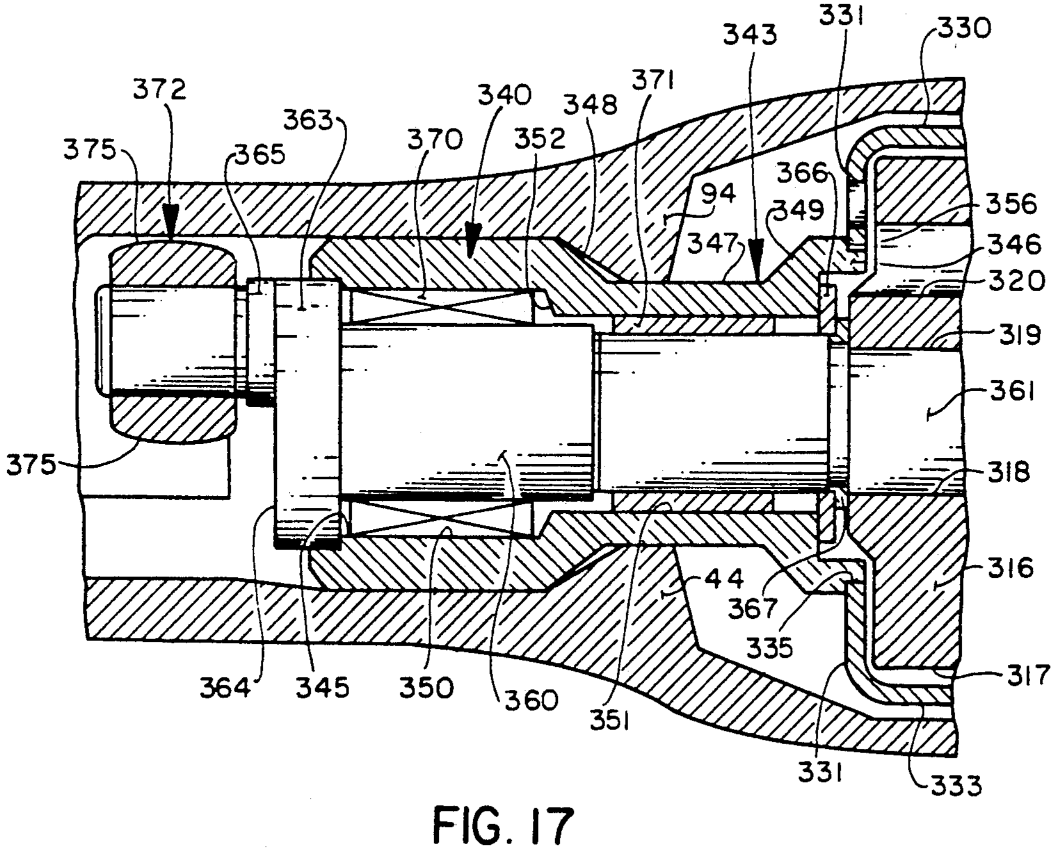
FIG. 17 is an enlargement of that portion of FIG. 2 depicting the bearing block.

The tool 10, as shown in FIG. 15, comprises a gear reducer assembly 310 including an internal ring gear or sleeve 311 having an outer surface 312 and a toothed inner surface 313. A tab 314 extends radially outwardly from the outer surface 312. The gear reducer assembly 310 further includes three planet gears 315, three planet gear pins 321, and a carrier gear 316 (FIG. 2). Only one of the planet gears 315 and one of the gear pins 321 are shown in FIG. 15. As shown in FIG. 17, the carrier gear 316 has an outer surface 317 and a toothed central opening 318. Three bores 320 are equiangularly spaced around the opening 318. Only one of the bores 320 is shown in FIG. 17. Each of the bores 320 extend between opposite ends of the carrier gear 316.

The tab 314 is disposed within the recess 70 in the base member 30 (FIG. 2). Each of the planet gears 315 is disposed between the toothed end 272 of the rotor 268 and the toothed inner surface 313 of the sleeve 311. The carrier gear 316 is disposed in the housing 20 adjacent the end 272 of the shaft 270 and adjacent the planet gears 315. A planet gear pin 321 is disposed in each of the bores 320 in the carrier gear 316 and the planet gears 315 (FIG. 2).

Referring to FIGS. 3 and 17, the ratchet tool 10 further comprises a cup washer 330 including a front end 331, a rear end 332 and an outer surface 333. The cup washer 330 further includes a central opening at the front end 331 defining a cyindrical surface 335. The cup washer 330 is disposed in the housing 20, with the front end 331 abutted against the lugs 34 and 35 of the base member 30 and the lugs 84 and 85 of the cover member 80 while the rear end 332 abuts against the sleeve 311. The gear carrier 36 is centrally disposed within the interior of the cup washer 330.

After assembly of the parts in the housing 20, the screw 140 is tightened, causing the manifold 170 to move towards the front end 21 of the housing 20. The axial force is transferred to the gasket 230, the member 240, the motor liner 261, the member 290, the sleeve 311 and the cup washer 330, against the lugs 34, 35, 84 and 85. As a result, the members 240 and 290 are drawn towards the motor liner 261, and the O-rings 280 and 281 are squeezed axially so as to be forced radially outwardly against the inner surfaces 31 and 81 respectively of the members 30 and 80. In this manner, the motor 260 is securely mounted within the housing 20 and is isolated thermally and vibrationally from the housing 20. Also, a seal is provided to prevent air from flowing radially and between the motor liner 261 and the members 240 and 290.

Figure 16:
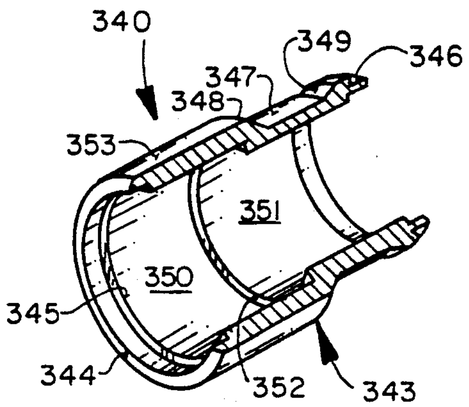
FIG. 16 is a sectioned perspective view of the bearing block of the ratchet tool.

Referring to FIG. 16, the ratchet tool 10 further comprises a bearing block 340 including an outer surface 343, a larger diameter cylindrical portion 353 and a longitudinally extending bore 344 defining an inner surface 345. The outer surface 343 is defined by a smaller diameter cylindrical portion 347 and conical portions 348 and 349 respectively at opposite ends of the cylindrical portion 347. The conical portions 348 and 349 diverge from the cylindrical portion 347. Protruding rearwardly from the conical portion 349 is a generally cylindrical collar 346. Referring also to FIG. 17, the inner surface 345 has a larger diameter cylindrical portion 350 and a smaller diameter cylindrical portion 351 separated by a lateral face 352.

As is best seen in FIG. 3, the outer surface 343 of the bearing block 340 cooperates with the outer surface 39 of the lugs 34 and 35. More particularly, the cylindrical portion 347 is adjacent to and slightly spaced from the part-cylindrical portion 40 on each of the lugs 34 and 35 and the conical portions 348 and 349 mate respectively with the part-conical portions 41 and 42 on each of the lugs 34 and 35. Referring to FIGS. 3 and 8, the outer surface 343 also cooperates with the outer surface 89 of the lugs 84 and 85 to provide a rigid interconnection between the bearing block 340 and the housing 20. More particularly, the cylindrical portion 347 is adjacent to and slightly spaced from the part-cylindrical portion 90 and the conical portions 348 and 349 mate respectively with the part-conical portions 91 and 92 on each of the lugs 84 and 85.

As shown in FIG. 17, the cylindrical portion 347 rests against the pedestals 44 and 94 respectively on the members 30 and 80 to further provide a rigid interconnection between the bearing block 340 and the housing 20. Further, the bearing block 340 extends into the central opening of the cup washer 330 such that the radial face 356 abuts the front end 331 and the collar 346 engages the cylindrical surface 335. The ratchet tool 10 further comprises a crank shaft 360 including a toothed surface 361 and a collar 363. The collar 363 has a radial face 364. A finger 365 extends axially outwardly from the face 364. The crank shaft 360 is rotatably located within the bore 344 of the bearing block 340. The toothed surface 361 extends through the opening in the cup washer 330 and engages the toothed inner surface 319 of the gear carrier 316. Since the toothed gear carrier 316 is centrally disposed within the cup washer 330, and the crank shaft 360 is centrally disposed within the opening in the cup washer 330 due to the mating relationship between the bearing block 340 and the cup washer 330, proper alignment between the gear carrier 316 and the crank shaft 360 is assured without the need of adjustment.

Referring to FIG. 17, the ratchet tool 10 further comprises a crank stop washer 366 which surrounds the shaft 360 and is disposed against the end of the bearing block 340. A ring 367 surrounds the toothed surface 361 and abuts the washer 366 and the gear carrier 316. The ring 367 prevents the shaft 360 from moving longitudinally in the bore 344.

The ratchet tool 10 further comprises a pair of bearings 370 and 371 which are supported and located in the block 340. The bearings 370 and 371 are supported and located such that the bearing 370 contacts the cylindrical portion 350 of the inner surface 345 and the bearing 371 contacts the cylindrical portion 351 of the inner surface 345.

Referring to FIGS. 3 and 17, with the particular arrangement of the bearing block 340, an operating load $F_1$ applied to the shaft 360 during fastener tightening or an operating load $F_2$ applied to the crank shaft 360 during fastener removal is transferred to the bearings 370 and 371, then to the bearing block 340, and then to the housing 20 via the lugs 34 and 35 and the lugs 84 and 85. More particularly, the force $F_1$ causes the transfer of corresponding reaction loads $F_3$ and $F_4$ respectively to the part-conical portions 41 and 42 respectively on the lugs 34 and 35, while the force $F_2$ causes the transfer of reaction loads $F_5$ and $F_6$ respectively to the part-conical portions 41 and 42 respectively on the lugs 34 and 35. When the members 30 and 80 are mated together, the force $F_1$ is transferred in a like manner to the part-conical portions 91 and 92 respectively on the lugs 85 and 84 while the force $F_2$ is transferred in a like manner to the part-conical portions 91 and 92 respectively on the lugs 84 and 85.

Part-conical portions 41 on lugs 34 and 35 extend from cylindrical portions 40 at an angle B. Part-conical portion 348 on bearing block 340 extends from cylindrical portion 347 also at angle B. Part-conical portions 42 on lugs 34 and 35 extend from cylindrical portions 40 at an angle A. Part-conical portion 349 on bearing block 340 extends from cylindrical portion 347 also at angle A. In the preferred embodiment, angles A and B are equal and are 45°. Referring to FIG. 8, part-conical portions 91 and 92 on lugs 84 and 85 extend from cylindrical portion 90 respectively at angles A and B. Referring back to FIG. 3, the distance between the applied loads $F_1$ or $F_2$ is maximized, thus minimizing the size of the respective reaction loads $F_3$ and $F_4$ or $F_5$ and $F_6$ since an applied load is a moment load.

As shown in FIG. 17, the ratchet tool 10 further comprises a drive ring 372 including opposite sides 375 and opposite arcuate ends 376 (FIG. 3). The drive ring 372 is disposed on the finger 365.

Referring to FIGS. 2, 3, and 18, the ratchet tool 10 further comprises a ratchet head 380 including a toothed cylindrical opening 381 and a part-cylindrical pocket 382. The ratchet head 380 is disposed between the arms 60 and 99 and the drive ring 372 is located within the pocket 382. The rotor 268, via the gear reducer assembly 310, causes rotation of the shaft 360 which causes the finger 365 and the ring 372 to travel in a circular path. The recesses 69 and 106 (FIGS. 6 and 8) respectively in the members 30 and 80 assure that the ring 372 does not contact the inner surfaces of the arms 60 and 99 while the ring 372 travels in its circular path. During one half of each cycle of rotation of the shaft 360 in one direction, the ring 372 causes the head 380 to rotate in one direction. For the balance of each cycle, the ring 372 causes the head 380 to rotate in the opposite direction.

Referring to FIGS. 2 and 18, the ratchet tool 10 further comprises a drive body 390 including a central portion 391, a head 392 extending from the central portion 391 and a square stud 393 extending from the head 392. The central portion 391 has a radially outwardly extending shoulder 394 and an arcuate slot 395. A central bore 397 extends inwardly into the central portion 391. An adjacent bore 398 extends inwardly into the central portion 391 and communicates with the slot 395. A counter-bore 404 surrounds the opening of the bore 398. A shoulder 399 is defined by the joinder of the central portion 391 and the head 392. A groove 400 extends circumferentially around the outer surface of the head 392. A bore 401 extends transversely through the stud 393. A spring 402 and a ball 403 are disposed within the bore 401. The drive body 390 extends through the openings 63 and 102 respectively in the arms 60 and 99 and through the opening 381 in the ratchet head 380.

The tool 10 further comprises a pawl 410 including toothed ends 411 and 412. The pawl 410 is located in the slot 395. A pin 413 extending through the bore 398 mounts the pawl 410 for rotation within the slot 395. An O-ring 420 is disposed in the counter-bore 404 (FIG. 19).

The ratchet tool 10 also comprises a knob 430 including an upper surface 431 and a lower surface 432. The lower surface 432 has a part-cylindrical projection 433 depending and extending axially outwardly therefrom. A shaft 434 having an outer surface 435 extends axially outwardly from the projection 433. An ear 436 protrudes from the outer surface 435 and is disposed adjacent the projection 433. A bore 437 extends transversely through the shaft 434. A spring 438 and a plunger 439 are located in the bore 437. The knob 430 is positioned above the drive body 390, the shaft 434 is disposed within the central bore 397, the plunger 439 abuts the pawl 410, and the ear 436 abuts the O-ring 420 (FIG. 19).

Figure 19:
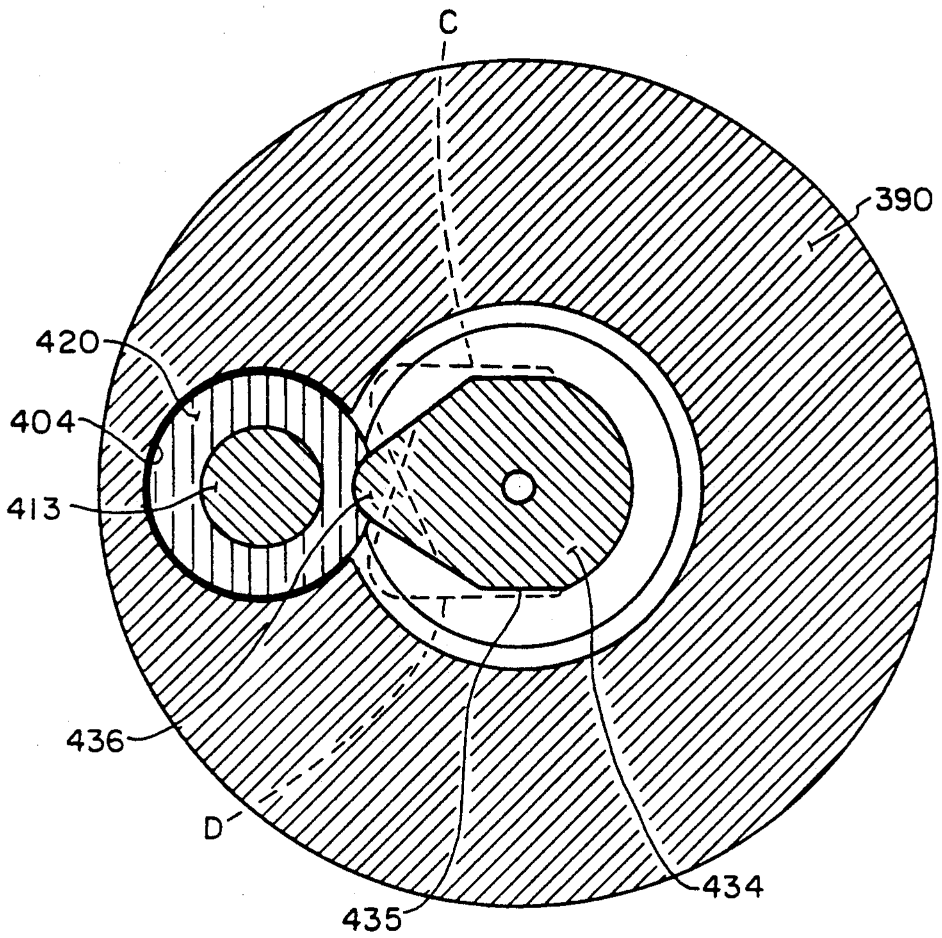
FIG. 19 is an enlarged cross-sectional view, taken along the line 19—19 of FIG. 2, with the two operating positions of the ear shown in phantom.

Referring to FIGS. 18 and 19, the knob 430 is rotatable between fastener tightening and loosening positions. When the knob 430 is in its fastener tightening position, the plunger 439 engages the pawl 410 near one toothed end to cause the same to engage the toothed cylindrical opening 381 of the ratchet head 380. In this condition, the tool 10 can be used to rotate a fastener (not shown) in a clockwise direction and to ratchet in a counterclockwise direction. When the knob 430 is rotated to its fastener loosening position, the plunger 439 engages the pawl 410 near the other toothed end to cause the same to engage the toothed cylindrical opening 381. In this condition, the tool 10 can be used to rotate the fastener in the counterclockwise direction and to ratchet in the clockwise direction.

During operation of the tool 10, the knob 430 has a tendency to "self-reverse", i.e., a condition where rotational forces on the plunger 439 during normal operation cause the knob 430 to reverse itself even though it had been positioned to tighten a fastener or vice versa. The ear 436, in combination with the O-ring 420, prevents the inadvertent rotation of the knob 430 while the ratchet tool is in use. As shown in FIG. 19, in order to move the ear 436 from position C in phantom corresponding to the fastener tightening position of the knob 430 to position D in phantom corresponding to the fastener loosening position of the knob 430, the O-ring 420 must be compressed as shown. That is easy to do when the user manually rotates the knob 430, but it cannot inadvertently occur during operation.

Referring to FIGS. 2 and 18, the ratchet tool 10 comprises an O-ring 440 disposed between the knob 430 and the drive body 390. In the preferred embodiment, the O-ring has a circular cross-section. The O-ring 440 is dispose between and in contact with the lower surface 432 of the knob 430 and the shoulder 394 of the drive body 390. Additionally, the O-ring 440 encircles the projection 433 and abuts against at least a portion thereof. The O-ring 440 is used to absorb shock in the event that the tool 10 is dropped and lands on the knob 430. The O-ring 440 isolates the resultant shock and prevents it from being transferred to the drive body 390, the arms 60 and 99, or the housing 20. As a result, damage to the housing 20 in the form of impact stresses is reduced.

The ratchet tool 10 further comprises a bushing 460 including a sleeve 461 having an inner surface 462 and an outer surface 463. The inner surface 462 has a longitudinal axis $Y_3$ in substantial alignment with the longitudinal axis $Y_1$. Further, the bushing 460 includes a flange 464 extending radially outwardly from the sleeve 461. The flange 464 has a periphery 465.

Figure 20:
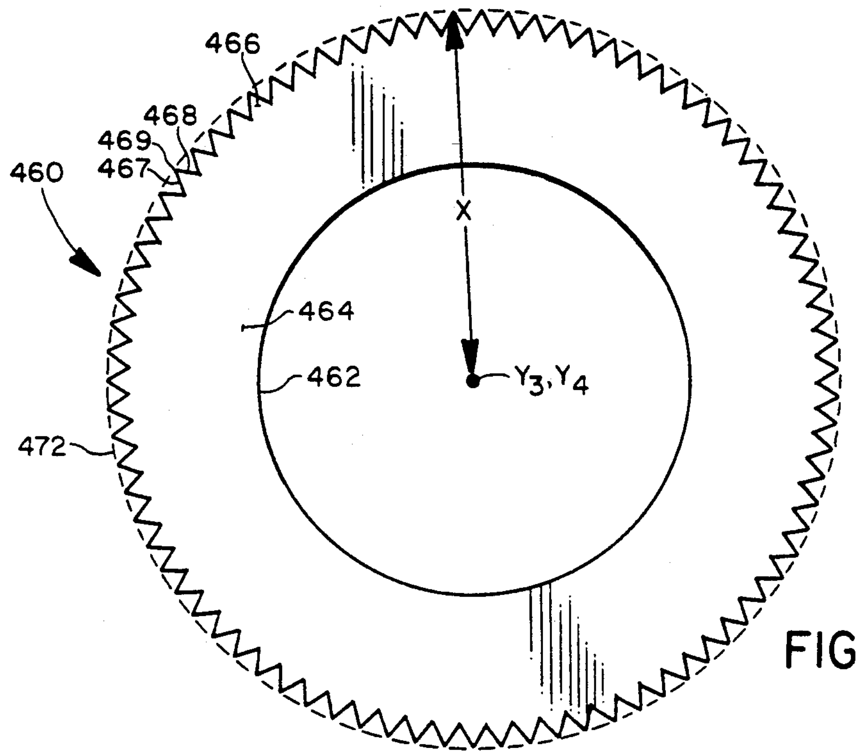
FIG. 20 is an enlarged plan view of the bushing shown in FIG. 18.

As shown in FIG. 20, a plurality of serrations 466 extend circumferentially around the periphery of the flange 464. Each of the serrations 466 has a pair of surfaces 467 and 468 intersecting to form a longitudinal edge 469 extending a radial distance X from the longitudinal axis $Y_3$. Because of manufacturing tolerances, the radial distance X which the edges 469 extend varies from edge to edge. As a result of such variations, the locus of the edges 469 defines a surface having a longitudinal axis not the same as the axis $Y_3$. Therefore, upon press fitting the bushing 460 into the opening 63, the axes $Y_1$ and $Y_3$, are not aligned, and the axes $Y_1$ and $Y_2$ are not aligned. Therefore, the drive body 390 cannot be disposed within the openings 63 and 102 without adjustment.

To overcome this problem, the periphery of the flange 464 is "turned" after the serrations 466 have been formed to assure that the distance X which the edges 469 extend from the longitudinal axis $Y_3$ is equal for all edges 469. In this manner, and as shown in FIG. 20, the locus of the edges 469 defines a cylindrical surface 472 having a longitudinal axis $Y_4$ in substantial alignment with the axis $Y_3$. Therefore, upon press fitting the bushing 460 to the opening 63, the axis $Y_3$ is substantially aligned with the axis $Y_1$. In this manner, the drive body 390 can be disposed within the openings 63 and 102 without adjustment.

Figure 21:
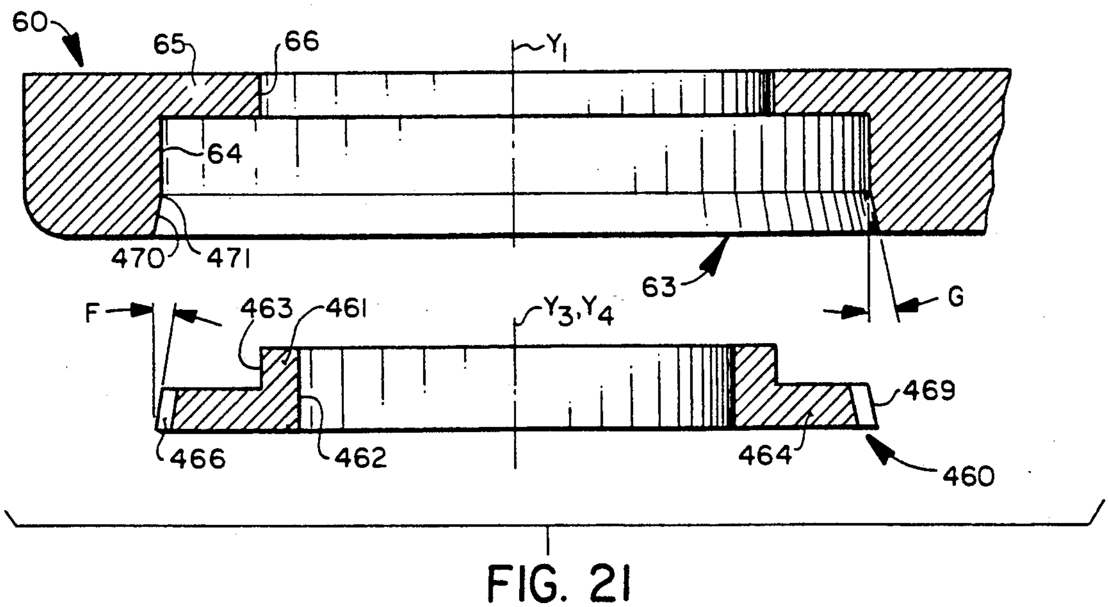
FIG. 21 is an enlarged cross-sectional view of the bushing and arm shown in FIG. 18.

Additionally, and as shown in FIG. 21, the serrations 466 may be tapered at an angle F with respect to the axis $Y_3$. In a preferred embodiment, the angle F is 11°. It is understood that each of the edges 469 is inclined at the same angle F with respect to the axis $Y_3$ In this manner, the locus of the edges 469 define a conical surface having a longitudinal axis identical to the axis $Y_4$ in substantial alignment with the axis $Y_3$.

As shown in FIG. 21, the opening 63 has a mouth 470 tapered at an angle G measured with respect to the longitudinal axis $Y_1$ of the surface 64 to define a conical outer surface 471. In a preferred embodiment, the angle G is 11° since the taper of the mouth 470 matches the taper of the serrations 466. When the bushing 460 is press fit into the opening 63, the inner surface 462 of the sleeve 461 abuts the drive body 390 while the surface 463 of the sleeve 461 tightly engages the surface 66 of the shoulder 65. The ribs 67, which are deformed upon press fitting, provide for a secure fit between the arm 60 and the bushing 460. In a like manner, the serrations 466 of the flange 464 tightly engage the outer surface 64 of the opening 63. More particularly, the edges 469 of the serrations 466 engage the surface 64 to provide for a secure fit between the bushing 460 and the arm 60 when torque is transferred from the drive body to the arm 60.

Referring to FIGS. 2 and 18, the ratchet tool 10 further comprises a washer 500 disposed against the bushing 460 and surrounding the drive body 390. A retaining ring 490 is disposed in the groove 400 in the drive body 390. A disk spring 480 is disposed between the washer 500 and the retaining ring 490. The flange 464 of the bushing 460, the washer 500, the spring 480 and the retaining ring 490 are disposed in the pocket defined by the shoulder 65 and the cylindrical surface 64 of the arm 60. The retaining ring 490 is generally flush with the outer surface 61 of the arm 60.

When a conventional ratchet tool 10 is operated to tighten a fastener, there is a tendency to oscillate it during the ratcheting portion of each cycle if there is not enough friction or back stopping between the fastener and the work piece. In the present invention, such slippage is prevented by providing friction between the drive body 390 and the housing 20 as follows. The spring 480 exerts a force against the retaining ring 490 and an opposite force of equal magnitude against the washer 500 to bias the shoulder 399 on the drive body 390 against the shoulder 62 (FIG. 6) on the arm 60 to provide friction between the drive body 390 and the arm 60. Because shoulder 394 on drive body 390 mates with shoulder 104 of arm 99, and because retaining ring 490 and shoulder 65 of arm 60 are forced toward each other (through wear washer 500, disk spring 480 and wear bushing 460), arms 60 and 99 are restrained from any tendency to spread while ratchet tool 10 is operating.

While a particular embodiment of this invention has been described, it is understood that changes can be made in such embodiment without departing from the spirit or scope of the invention as defined in the claims.

What is claimed is:

1. A ratchet tool comprising: an elongated housing including a front end and a rear end, motor means in said housing having an axis extending between the front and rear ends, a manifold in said rear end of said housing and disposed entirely rearwardly of said motor means, said manifold including a front end and a rear end and a transverse end wall at said front end of said manifold extending substantially perpendicular to said axis and a transverse intermediate wall and a longitudinal intermediate wall extending between said transverse intermediate wall and said transverse end wall, said manifold including an exhaust chamber extending longitudinally through said manifold along one side thereof substantially parallel to said axis, said manifold including a first passageway and a bore communicating with said first passageway and a second passageway communicating with said bore for delivering air to said motor means, said bore being formed in the side of said manifold opposite said one side and terminating short of said one side, said second passageway extending from said bore and terminating in an inlet aperture in said transverse end wall, the air flowing through said first passageway and said bore and said second passageway and said inlet aperture, said first passageway being located in said transverse intermediate wall, said manifold including an exhaust chamber bounded by said longitudinal intermediate wall to exhaust air from said motor means, drive means in said front end of said housing, and means in said housing for coupling said motor means to said drive means and thereby transferring power from said motor means to said drive means.

2. The ratchet tool of claim 1, wherein said housing has an opening at said rear end, and further comprising sealing means including a seal engaging said rear end of said manifold and a washer engaging said seal, said seal and said washer each having an opening defined by an inner surface, and further comprising an exhaust nut extending into said opening in said housing and said seal and said washer, said exhaust nut including an outer surface cooperating with said inner surface of said seal and said washer to define a second chamber.

3. A ratchet tool comprising: an elongated housing including a front end and a rear end, said housing including a base member and a cover member, each of said members having an inner surface and opposite side edges, said base member having a pair of first lugs on said inner surface, said pair of first lugs being located opposite each other along said opposite side edges, said cover member having a pair of second lugs on said inner surface, said pair of second lugs being located opposite each other along said opposite side edges, said first lugs respectively mating with said second lugs, said base member having an abutment on said inner surface adjacent said pair of first lugs and extending between said opposite side edges, motor means in said housing producing a predetermined volume of exhaust air at an exhaust passage, a manifold in said rear end of said housing, said manifold including inlet means for delivering air to said motor means and outlet means for receiving exhaust air from said motor means, said outlet means including a chamber communicating directly with said exhaust passage and shaped so as to have a relatively small ratio of surface area to volume, said chamber having a volume which is greater than the predetermined volume of exhaust air by an amount sufficient to dampen and dissipate Helmholtz frequencies, drive means in said front end of said housing, and means in said housing for coupling said motor means to said drive means and thereby transferring power from said motor means to said drive means.

4. The ratchet tool of claim 3, wherein said chamber has a longitudinal dimension and a transverse dimension, the transverse dimension being at least one-half the longitudinal dimension.

5. The ratchet tool of claim 3, wherein the volume of the chamber is at least three times the predetermined volume.

6. The ratchet tool of claim 3, wherein the volume of the chamber is substantially five times the predetermined volume.

7. The ratchet tool of claim 3, wherein said chamber has an entry portion and an exit portion and a central portion therebetween, the central portion having an axial dimension and a transverse dimension, said dimensions being of the same order of magnitude.

8. The ratchet tool of claim 3, wherein said manifold is generally cylindrical, said manifold including a front end and a rear end and a transverse end wall at said front end.

9. The ratchet tool of claim 3, wherein said manifold includes an outer surface, said outer surface having opposed side recesses and a bottom recessed portion, each of said lugs and said abutment having an outer surface, said outer surface of each of said lugs being adjacent to the associated one of said opposed side recesses of said manifold, and said outer surface of said abutment mating with said bottom recessed portion of said manifold.

10. The ratchet tool of claim 3, wherein each of said lugs has a hole therein, said holes in mating ones of said lugs being coaxial, and further comprising a screw extending through said mating coaxial holes in said lugs for attaching said members together.

11. A ratchet tool comprising: an elongated housing including a front end and a rear end, motor means in said housing producing a predetermined volume of air at an exhaust passage, a manifold in said rear end of said housing, said manifold including a front end and a rear end and a transverse end wall at said front end, said manifold including a first manifold passageway and a bore communicating with said first manifold passageway and a second manifold passageway communicating with said bore for delivering air to said motor means, said second manifold passageway extending from said bore and terminating in an inlet aperture in said transverse wall, the air flowing through said first manifold passageway and said bore and said second manifold passageway and said inlet aperture, said manifold including a chamber for receiving exhaust air from said motor means, said chamber communicating directly with said exhaust passage and shaped so as to have a relatively small ratio of surface area to volume, said chamber having a volume which is greater than the predetermined volume of exhaust air by an amount sufficient to dampen and dissipate Helmholtz frequencies, a member in said housing between said motor means and said front end of said manifold, said member including opposed end walls and first and second member passageways extending between said end walls, said first member passageway communicating with said chamber in said manifold and said second member passageway communicating with said second manifold passageway for transferring inlet air from said manifold to said motor means and exhaust air from said motor means to said manifold, a gasket in said housing between said member and said front end of said manifold, said gasket including first and second apertures, said first aperture in said gasket communicating with said first member passageway and said chamber in said manifold, said second aperture in said gasket communicating with said second member passageway and said second manifold passageway, drive means in said front end of said housing, and means in said housing for coupling said motor means to said drive means and thereby transferring power from said motor means to said drive means.

12. The ratchet tool of claim 11, wherein said first passageway extends longitudinally of said housing and said bore extends transversely to said first passageway.

13. The ratchet tool of claim 11, wherein said inlet aperture is arcuate.

14. The ratchet tool of claim 11, wherein said chamber extends longitudinally and parallel to said first passageway.

15. A ratchet tool comprising: an elongated housing including a front end and a rear end and an opening at said rear end, said housing including first and second members, each of said members having an inner surface and two opposite longitudinal side edges, the side edges of said first member being respectively adjacent to the side edges of said second member in non-fluid-tight relationship, motor means in said housing, drive means in said front end of said housing, means in said housing coupling said motor means to said drive means and transferring power from said motor means to said drive means, a manifold in said rear end of said housing and including a front end and a rear end, said manifold including inlet means for delivering air to said motor means and outlet means for receiving exhaust air from said motor means, said exhaust air flowing through said rear end of said manifold toward sand inner surface of said first and second members, and sealing means in said housing between said rear end of said manifold and said opening in said housing for minimizing the flow of exhaust air along said inner surface of said first and second members.

16. The ratchet tool of claim 15, wherein said manifold includes a circumferentially extending peripheral edge at said rear end, and said sealing means includes a seal engaging said peripheral edge and a washer engaging said seal, said seal and said washer each having an outer surface engaging said inner surface of each of said first and second members.

17. The ratchet tool of claim 16, wherein said seal and said washer each have an opening defined by an inner surface, and further comprising an exhaust nut extending into said opening in said housing and said seal and said washer, said exhaust nut abutting said inner surface of said washer, said washer having an aperture between said inner surface and said outer surface whereby the exhaust air flows through said rear end of said manifold and into said aperture in said washer and through said opening in said housing.

18. The ratchet tool of claim 15, wherein each of said first and second members has a shoulder on said inner surface thereof, said shoulder on said first member mating with said shoulder on said second member, said mating shoulders being located between said rear end of said manifold and said opening in said housing such that said sealing means engages said shoulders.

* * * * *

UNITED STATES PATENT AND TRADEMARK OFFICE

CERTIFICATE OF CORRECTION

PATENT NO. : 5,309,714

DATED : May 10, 1994

INVENTOR(S) : Gordon A. Putney and Kenneth C. Happ

It is certified that error appears in the above-indentified patent and that said Letters Patent is hereby corrected as shown below:

Column 19, line 5, "sand" should be --said--.

Signed and Sealed this

Sixteenth Day of August, 1994

Attest:

BRUCE LEHMAN

*Attesting Officer* *Commissioner of Patents and Trademarks*